(12) United States Patent
Adkins et al.

(10) Patent No.: US 6,600,150 B1
(45) Date of Patent: Jul. 29, 2003

(54) ENCODER SYSTEMS FOR PRINTERS AND RELATED METHODS

(75) Inventors: Christopher Alan Adkins, Lexington, KY (US); Lucas David Barkley, Lexington, KY (US); Michael Anthony Marra, III, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 141 days.

(21) Appl. No.: 09/898,325

(22) Filed: Jul. 3, 2001

(51) Int. Cl.[7] .................................................. G01D 5/34
(52) U.S. Cl. .............................. 250/231.13; 250/231.18
(58) Field of Search ...................... 250/231.13, 231.18, 250/231.16, 559.12, 559.15, 214 PR; 318/439; 341/11–13

(56) References Cited

U.S. PATENT DOCUMENTS

| | | |
|---|---|---|
| 4,318,617 A | 3/1982 | Orsen |
| 4,417,141 A | 11/1983 | Phillips |
| 4,429,267 A | 1/1984 | Veale |
| 4,524,347 A | 6/1985 | Rogers |
| 4,599,547 A | 7/1986 | Ho |
| 4,621,256 A | 11/1986 | Rusk |
| 4,654,636 A | 3/1987 | Rusk |
| 4,673,810 A * | 6/1987 | Babsch et al. ............ 250/231.1 |
| 4,795,901 A | 1/1989 | Kitazawa |
| 4,796,005 A | 1/1989 | Ishida et al. |
| 4,831,510 A | 5/1989 | Dummermuth et al. |
| 4,912,468 A | 3/1990 | Rust |
| 4,922,175 A | 5/1990 | Sugiura et al. |
| 4,970,450 A | 11/1990 | Karl et al. |
| 5,191,336 A | 3/1993 | Stephenson |
| 5,414,516 A | 5/1995 | Morishita et al. |
| 5,506,579 A | 4/1996 | Spaulding |
| 5,625,310 A | 4/1997 | Takeishi |
| 5,665,965 A | 9/1997 | Durham, III |
| 5,677,686 A | 10/1997 | Kachi et al. |
| 6,037,735 A | 3/2000 | Janosky et al. |
| 6,087,654 A | 7/2000 | Durham, III |

* cited by examiner

*Primary Examiner*—Que T. Le
(74) *Attorney, Agent, or Firm*—Thompson Hine, LLP; Scott N. Barker, Esq.

(57) ABSTRACT

An analog encoder system repeatedly switches back and forth between monitoring of first and second encoder output signals to track movement of a structure associated with the encoder. Switching between signals is controlled according to an upper intersection amplitude and a lower intersection amplitude of the two encoder output signals.

42 Claims, 3 Drawing Sheets

ENCODER SYSTEMS FOR PRINTERS AND RELATED METHODS

TECHNICAL FIELD

The present invention relates generally to encoder systems used for tracking movement of mechanical structures and, more particularly, to an analog encoder system and related method which facilitates proper position tracking even where the analog signals output by the encoder are distorted from an ideal.

BACKGROUND OF THE INVENTION

Presently known analog encoder systems are often expensive due to the nature of the design, particularly due to the cost in manufacturing an encoder which will produce ideal analog output signals. Less expensive analog encoder systems, such as those using an encoder mask which is external to the photo sensors, may produce distorted analog output signals. For example, where the ideal analog output signals are triangle waves, less expensive encoder systems may instead produce more sinusoidal output signals which lack linearity throughout the entire signal.

It would be advantageous to provide an encoder system for tracking position even where the analog output signal of the encoder varies from the ideal.

SUMMARY OF THE INVENTION

In one aspect, a method for tracking movement of a structure utilizing first and second encoder output signals produced by an encoder system associated with the structure is provided. The first and second encoder output signals are out of phase with each other and amplitudes of the first and second encoder output signals repeatedly intersect each other near an upper intersection amplitude and a lower intersection amplitude. The method involves (a) tracking movement of the structure based upon the first encoder output signal when an amplitude of the first encoder output signal is within a range defined by the upper intersection amplitude and the lower intersection amplitude and an amplitude of the second encoder output signal is outside the range; and (b) tracking movement of the structure based upon the second encoder output signal when the amplitude of the second encoder output signal is within the range and the amplitude of the first encoder output signal is outside the range.

In another aspect, a method for tracking movement of a structure involves producing a first encoder output signal of varying amplitude. A second encoder output signal of varying amplitude is produced, the second encoder output signal out of phase with the first encoder output signal, the amplitude of the first encoder output signal and the amplitude of the second encoder output signal repeatedly intersecting over time near an upper intersection amplitude and a lower intersection amplitude. For a defined direction of the encoder, four cycle segments are defined, including: a first cycle segment during which the amplitude of the first encoder output signal falls within a range defined by the upper intersection amplitude and the lower intersection amplitude and the amplitude of the first encoder output signal is increasing; a second cycle segment during which the amplitude of the first encoder output signal falls outside the range and the amplitude of the second encoder output signal is increasing; a third cycle segment during which the amplitude of the first encoder output signal falls within the range and the amplitude of the first encoder output signal is decreasing; and a fourth cycle segment during which the amplitude of the first encoder output signal falls outside the range and the amplitude of the second encoder output signal is decreasing. Movement of the structure is tracked based upon the first encoder output signal during the first cycle segment and the third cycle segment. Movement of the structure is tracked based upon the second encoder output signal during the second cycle segment and the fourth cycle segment.

In a further aspect, an analog encoder system for tracking movement of a structure includes a first encoder output providing a first encoder output signal and a second encoder output providing a second encoder output signal. The first and second encoder output signals vary in amplitude as the structure moves, the first and second encoder output signals are out of phase with each other, and the first and second encoder output signals repeatedly intersect each other. A controller receives the first and second encoder output signals and tracks movement of the structure based upon the first encoder output signal when an amplitude of the first encoder output signal is within a range defined by an upper intersection amplitude and a lower intersection amplitude and an amplitude of the second encoder output signal is outside the range. The controller tracks movement of the structure based upon the second encoder output signal when the amplitude of the second encoder output signal is within the range and the amplitude of the first encoder output signal is outside the range.

In still a further aspect, an analog encoder system for tracking movement of a structure includes a first encoder output providing a first encoder output signal and a second encoder output providing a second encoder output signal. The first and second encoder output signals vary in amplitude as the structure moves, the first and second encoder output signals are out of phase with each other, and the first and second encoder output signals repeatedly intersect each other. A controller receives the first and second encoder output signals and tracks both a coarse position of the structure and a fine position of the structure. The controller tracks a coarse position over time according to a number of times an upper intersection amplitude and a lower intersection amplitude are crossed by the tracked encoder signal.

In another aspect, an analog encoder system for tracking movement of a structure includes a first encoder output providing a first encoder output signal and a second encoder output providing a second encoder output signal. The first and second encoder output signals vary in amplitude as the structure moves, the first and second encoder output signals are out of phase with each other, and the first and second encoder output signals repeatedly intersect each other. A controller receives the first and second encoder output signals and tracks a fine position of the structure by repeatedly switching back and forth between monitoring of the first encoder output signal and monitoring of the second encoder output signal.

DETAILED DESCRIPTION

Figure 1:
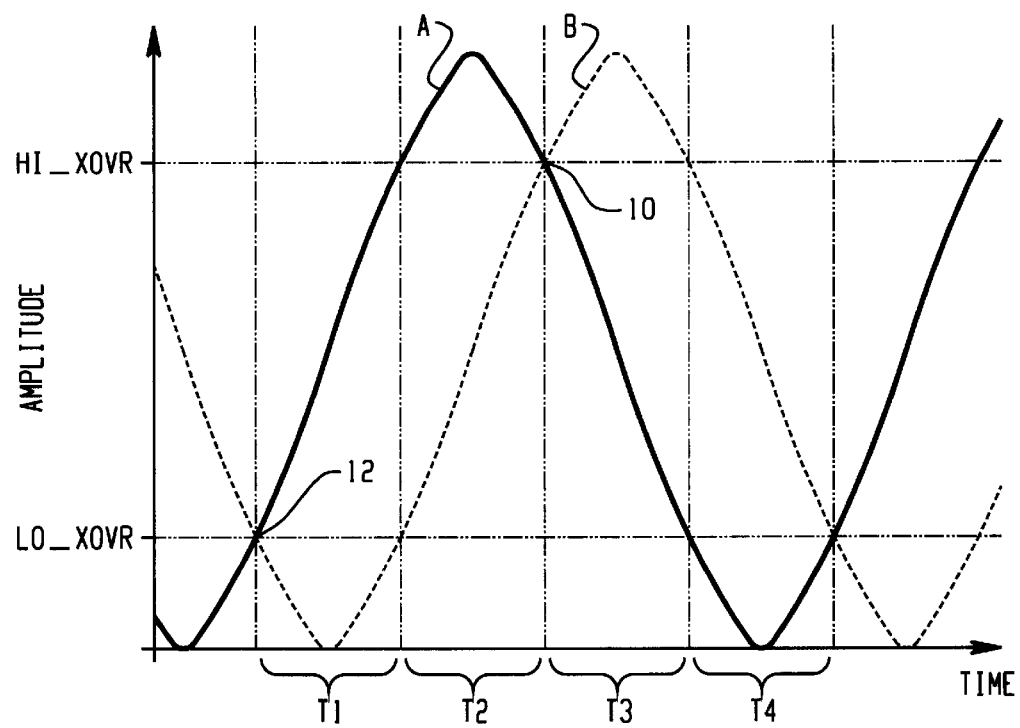
FIG. 1 illustrates two encoder output signals of an encoder.

Referring to FIG. 1, two typical analog encoder output signals A and B are shown. Each encoder output signal is produced by a respective channel or output of an encoder to be described in more detail below. The encoder output signals A and B vary in amplitude and have a period which varies with a speed of movement of a structure being monitored by the encoder. The signals could be produced by linear or rotary type encoders. Ideally the encoder output signals would be triangle waveforms, but in practice the max and min regions of each of the encoder output signals are often distorted resulting in rounded off triangle waveforms as shown. Each encoder output signal may typically be substantially linear when between an upper intersection amplitude HI_XOVR and a lower intersection amplitude LO_XOVR, where HI_XOVR approximates the upper amplitude where the A and B signals intersect such as at point 10 and LO_XOVR approximates the lower amplitude where the A and B signals intersect such as at point 12. As used herein the terminology "substantially linear" does not require absolute linearity. While the illustrated encoder output signals are shown as being out of phase with each other by 90°, the methods described herein are contemplated for use with signals which are out of phase with each other by more or less than 90°.

In one embodiment, a method of tracking the movement of a structure associated with the analog encoder producing A and B encoder signals involves tracking movement of the structure based upon one or the other of signals A and B at any given time. In particular, during periods T1 and T3, when an amplitude of the A signal is within a range defined by HI_XOVR and LO_XOVR and an amplitude of the B signal is outside the range, the A signal is monitored. During periods T2 and T4, when the amplitude of the B signal is within the range defined by HI_XOVR and LO_XOVR and the amplitude of the A signal is outside the range, the B signal is monitored.

Figure 2:
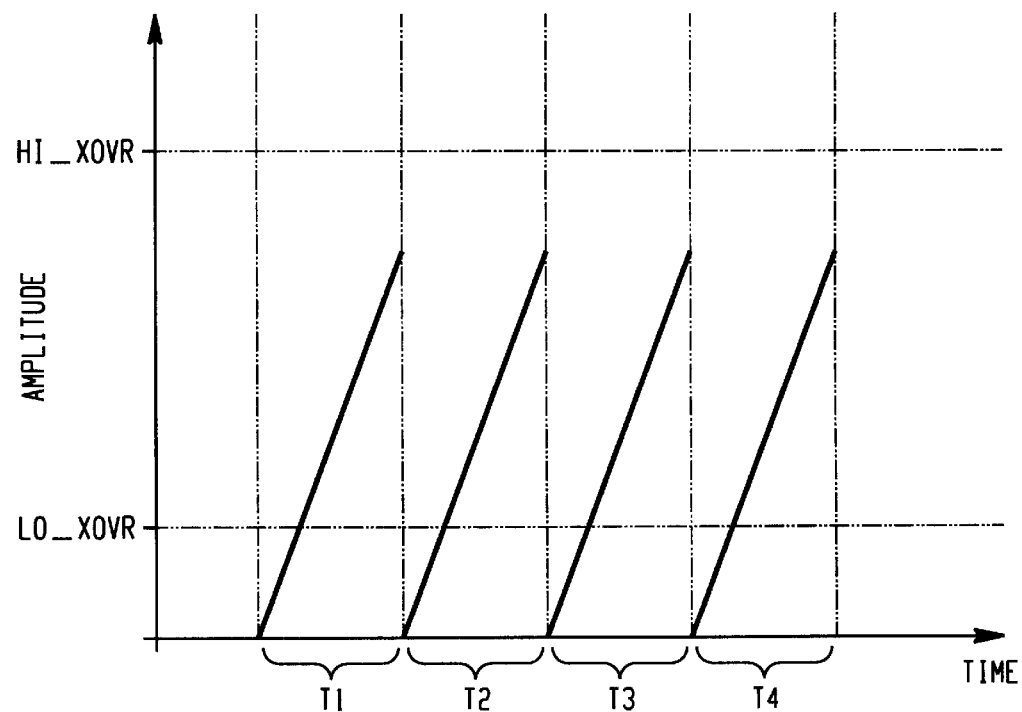
FIG. 2 illustrates one embodiment of fine position tracking for each period or cycle segment.
Figure 3:
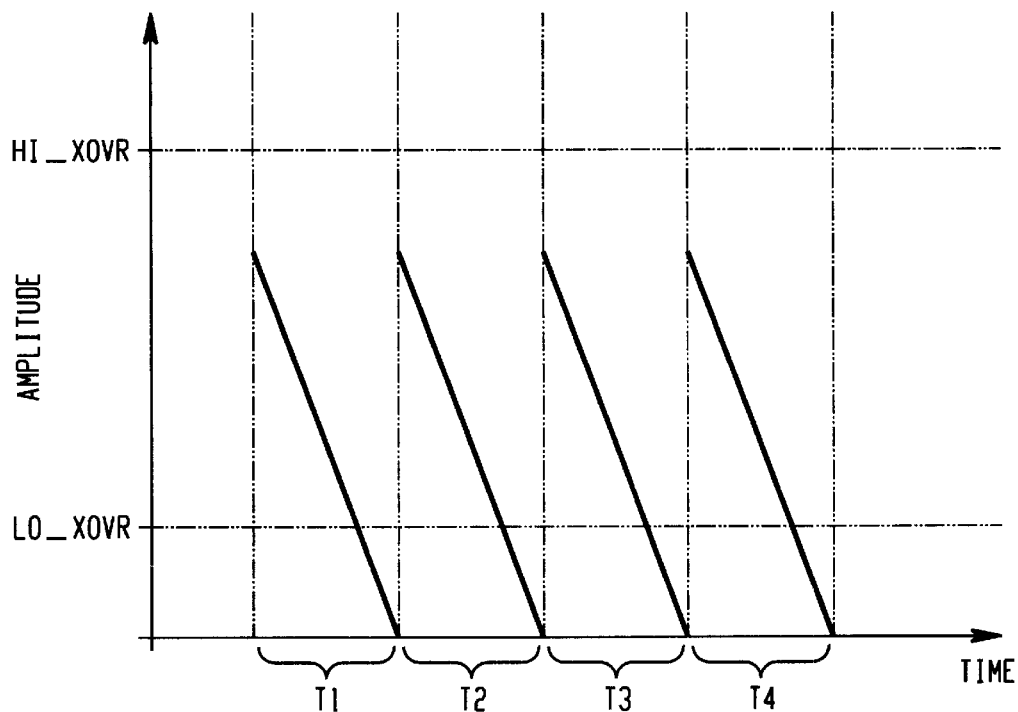
FIG. 3 illustrates another embodiment of fine position tracking for each period or cycle segment.

In one embodiment, during period T1 position of the structure is tracked as a function of the amplitude of the A signal minus the lower intersection amplitude LO_XOVR. During period T2 position of the structure is tracked as a function of the amplitude of the B signal minus the lower intersection amplitude LO_XOVR. During period T3 position of the structure is tracked as a function of the upper intersection amplitude HI_XOVR minus the amplitude of the A signal. During period T4 position of the structure is tracked as a function of the upper intersection amplitude HI_XOVR minus the amplitude of the B signal. The resulting fine position for each period T1, T2, T3 and T4 is illustrated in FIG. 2 and provides a fine position signal which increases in amplitude during each of the periods as the encoder moves in a defined forward direction (signals from left to right in FIGS. 1 and 2). Of course, variations on the exact calculation made to track fine position are possible. For example, and as reflected in FIG. 3, in another embodiment calculations could be made to produce fine position signals which decrease in amplitude as the encoder moves in the forward direction, with the system configured to properly interpret the decreasing amplitude fine position signals as encoder movement in a forward direction. In such an embodiment, during periods T1 and T2 the position would be determined as a function of the upper intersection amplitude minus the amplitude of the signal being tracked and during periods T3 and T4 position would be determined as a function of the amplitude of the signal being tracked minus the lower intersection amplitude. While the embodiments of FIGS. 2 and 3 may be considered desirable from the standpoint that in each embodiment the amplitude of the fine position signal always varies in the same direction during the periods T1, T2, T3 and T4 if the encoder maintains its same direction of movement, it is recognized that still other variations are possible. By way of example and not by way of limitation, fine position might be calculated to produce, for forward direction of the encoder, a fine position value or signal which increases in amplitude during periods T1 and T3 and decreases in amplitude during periods T2 and T4.

In addition to fine position, a coarse position regarding movement of a structure can also be tracked. The coarse position may be defined by the number of times a given one of the signals A or B crosses over one of the intersection amplitudes HI_XOVR or LO_XOVR, thus by the number of times the particular signal being tracked crosses over the one of the intersection amplitudes. By maintaining a running count of this number, coarse position is tracked. The running count can be incremented if the crossover occurs while the encoder is moving in a forward direction and could be decremented if the crossover occurs while the encoder is moving in a reverse direction. Between each of the coarse position increments fine position is tracked accordance with the above description for each period T1, T2, T3 and T4. Periods T1, T2, T3 and T4 also define cycle segments for a given cycle of the A an B signals. Coarse position tracking can also be termed a function of the number of cycle segments which have passed.

Figure 4:
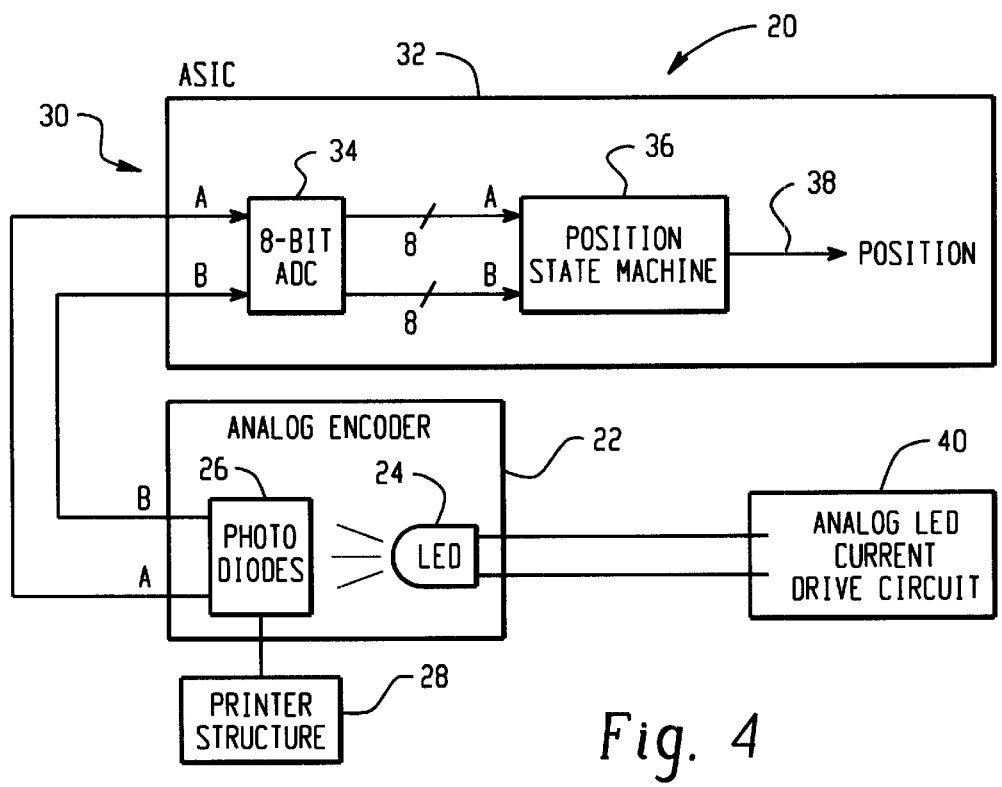
FIG. 4 is a schematic of one embodiment of an analog encoder system.

Referring now to the schematic diagram of FIG. 4, one embodiment of an analog encoder system 20 for implementing the above methods is shown. The system includes an analog encoder 22 including a light element 24 such as an LED and photo sensors 26 which may take the form of photo diodes. In the case of a rotary encoder a rotating, windowed mask may be positioned between the light element 24 and photo sensors 26. In the case of a linear encoder the light element 24 and photo sensors 26 may move relative to a fixed, windowed encoder mask strip. The encoder 22 may include gain and dc offset circuitry (not shown) associated with each channel. A structure 28 such as a rotating printer feed roller or a reciprocating print head carriage mounted for movement across a paper path is associated with the encoder 22 as is commonly known in the art. The encoder 22 includes A and B outputs providing the A and B output signals to a controller 30. The controller implements the movement monitoring methods. In the illustrated embodiment the controller 30 includes an ASIC 32 with an A/D converter 34 receiving the analog A and B signals of the encoder 22. The A/D converter 34 outputs the converted A and B signals to a position state machine 36. The position state machine 36 includes a position output 38 which may feed another control mechanism which controls movement of the printer structure 28 and may also feed other control components of a printer such as those which control the timing of printing. A current drive circuit 40 for energizing the encoder light element 24 is also shown.

Figure 5:
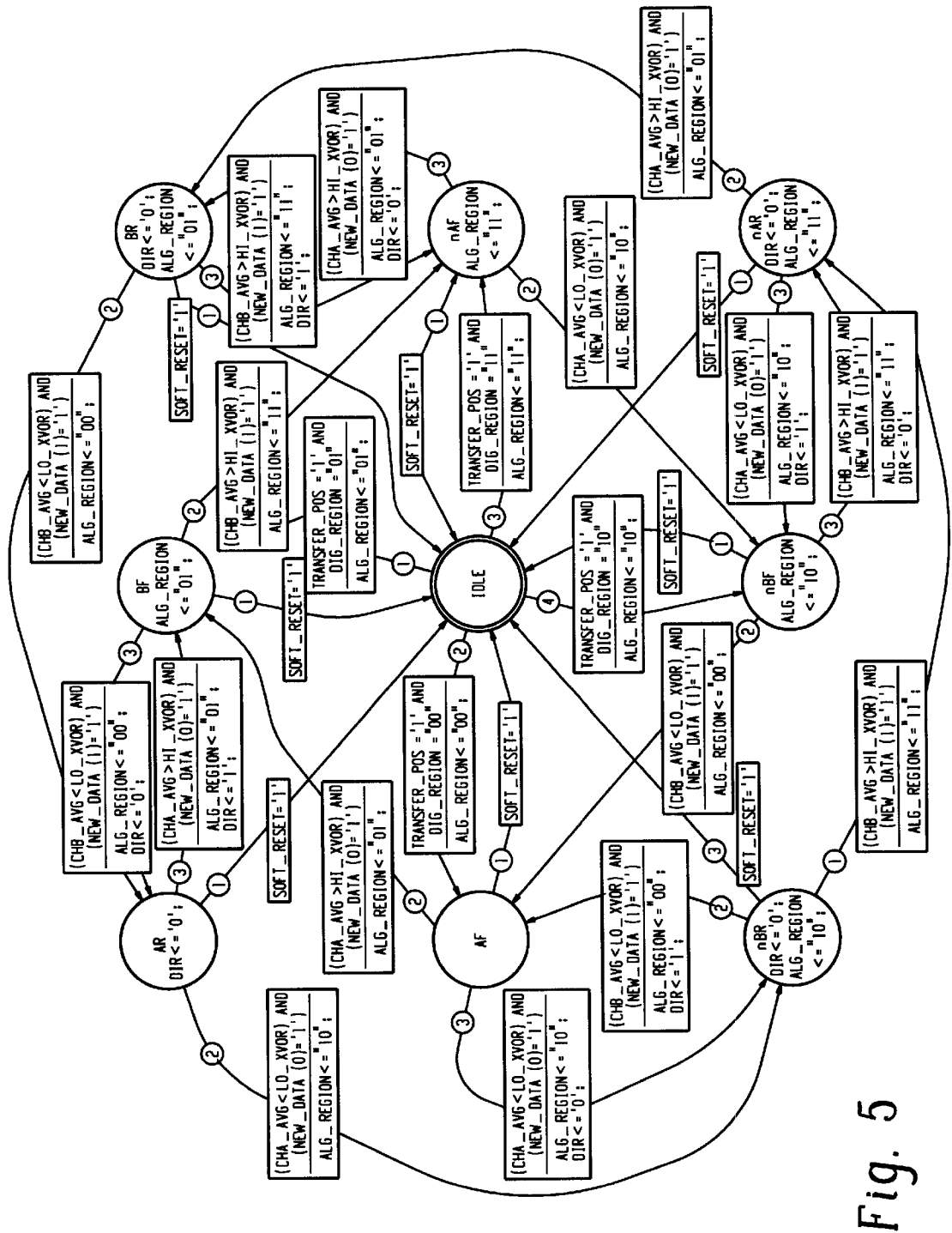
FIG. 5 is a state diagram of the state machine of FIG. 3.

In operation, the position state machine 36 monitors the A and B signals as described above to determine the fine position and coarse position of the printer structure. An exemplary state diagram for one embodiment of the state machine 36 is shown in FIG. 5. Nine states are shown, namely states AF, BF, nAF, nBF, AR, BR, nBR, nAR and IDLE. Relative to FIG. 1, state AF corresponds to cycle segment T1 with the encoder moving in the forward direction (signals from left to right in FIG. 1); state BF corresponds to cycle segment T2 with the encoder moving in a forward direction; state nAF corresponds to cycle segment T3 with the encoder moving in a forward direction; state nBF corresponds to cycle segment T4 with the encoder moving in a forward direction; state AR corresponds to cycle segment T1 with the encoder moving in the reverse direction (signals from right to left in FIG. 1); state BR corresponds to cycle segment T2 with the encoder moving in a reverse direction; state nAR corresponds to cycle segment T3 with the encoder moving in a reverse direction; state nBR corresponds to cycle segment T4 with the encoder moving in a reverse direction; and state IDLE corresponds to a state during which the position state machine 38 is not being used. For purposes of this discussion the IDLE state can be disregarded.

Examining an exemplary state machine progression during forward encoder movement, and assuming an initial cycle segment of T1, the state machine 36 begins in state AF. In this discussed embodiment of state machine 36 fine position tracking in accordance with FIG. 2 is contemplated. In this discuss NEW_DATA(0) corresponds to an output of the A/D converter 34 which is temporarily set to 1 each time new data for the A signal is placed on the A output. Similarly, NEW_DATA(1) corresponds to an output of the A/D converter 34 which is temporarily set to 1 each time new data for the B signal is placed on the B output.

During state AF the state machine 36 tracks position or movement as a function of the amplitude of the A encoder signal minus the lower intersection amplitude LO_XOVR until the A signal (CHA_AVG) goes above the upper intersection amplitude HI_XOVR and NEW_DATA(0) is set to 1. At that time ALG_REGION is set to binary "01" to indicate the T2 cycle segment and the state machine then moves to state BF. In state BF the state machine begins examining the B signal (CHB_AVG) and begins tracking position or movement as a function of the amplitude of the B signal minus the lower intersection amplitude LO_XOVR. When the B signal goes above upper intersection amplitude HI_XOVR and NEW_DATA(1) is set to 1, the state machine 36 sets ALG_REGION to binary "11" to indicate the T3 cycle segment and moves to state nAF. In state nAF the state machine again begins examining the A signal and begins tracking position or movement as a function of the upper intersection amplitude HI_XOVR minus the amplitude of the A signal. When the A signal (CHA_AVG) goes below lower intersection amplitude LO_XOVR and NEW_DATA(0) is set to 1, the state machine 36 sets ALG_REGION to binary "10" to indicate cycle segment T4 and moves to state nBF. In state nBF the state machine again begins examining the B signal and begins tracking position or movement as a function of the upper intersection amplitude minus the amplitude of the B signal. When the B signal (CHB_AVG) goes below the lower intersection amplitude LOW_XOVR and NEW_DATA(1) is set high, the state machine 36 sets ALG_REGION to binary "00" to indicate the T1 cycle segment. The AF to BF to nAF to nBF state sequence repeats as long as the encoder continues in the forward direction.

In the reverse encoder direction the state sequence is AR to nBR to nAR to BR. As shown, in state AR the A signal is examined to determine when to proceed to state nBR, namely when the A signal goes below the lower intersection amplitude LOW_XOVR. In state nBR the B signal is examined to determine when to move to state nAR, namely when the B signal goes above the upper intersection amplitude HI_XOVR. In state nAR the A signal is examined to determine when to proceed to state BR, namely when the A signal goes above the upper intersection amplitude HI_XOVR. In state BR the B signal is examined to determine when to proceed to state AR, namely when the B signal goes below the lower intersection amplitude LO_XOVR.

In any one of the forward or reverse states, the state machine 36 also monitors for a change in direction of the encoder. By way of example, in state AF if the A signal goes below the lower intersection amplitude the state machine 36 sets ALG_REGION to binary "10" to indicate the T4 cycle segment and moves to state nBR. Similarly, in state nBR if the B signal moves below the lower intersection amplitude LO_XOVR the state machine sets ALG_REGION to binary "00" to indicate the T1 cycle segment and the state machine moves to state AF. The state machine can make a similar move from each of the other forward states to a next reverse state, and visa-versa, in the event of a change in direction of the encoder.

Although the invention has been described above in detail referencing the illustrated embodiments thereof, it is recognized that various changes and modifications could be made without departing from the spirit and scope of the invention.

What is claimed is:

1. A method for tracking movement of a structure utilizing first and second encoder output signals produced by an encoder system associated with the structure, the first and second encoder output signals being out of phase with each other and amplitudes of the first and second encoder output signals repeatedly intersecting each other near an upper intersection amplitude and a lower intersection amplitude, the method comprising the steps of:

(a) tracking movement of the structure based upon the first encoder output signal when an amplitude of the first encoder output signal is within a range defined by the upper intersection amplitude and the lower intersection amplitude and an amplitude of the second encoder output signal is outside the range; and (b) tracking movement of the structure based upon the second encoder output signal when the amplitude of the second encoder output signal is within the range and the amplitude of the first encoder output signal is outside the range.

2. The method of claim 1 wherein the first and second encoder output signals, are substantially ninety degrees out of phase with each other.

3. The method of claim 2 wherein the encoder is a light type encoder and a magnitude of each the first and second encoder output signals varies at least in part as a function of an intensity of light received by first and second photo sensors respectively.

4. The method of claim 1 wherein the amplitude of the first encoder output signal varies in a substantially linear manner when within the range, and the amplitude of the second encoder output signal varies in a substantially linear manner when within the range.

5. The method of claim 1 wherein during steps (a) and (b) a fine position of the structure is tracked as a function of at least the amplitude of the first or second encoder output signal, the method comprising the further step of tracking a coarse position of the structure as a function of a number of times the upper intersection amplitude and lower intersection amplitude are crossed by the tracked encoder output signal.

6. The method of claim 5 wherein during a defined direction of movement of the encoder:

in step (a):
  if the amplitude of the first encoder output signal is increasing the fine position of the structure is tracked as a function of the amplitude of the first encoder output signal minus the lower intersection amplitude;
  if the amplitude of the first encoder output signal is decreasing the fine position of the structure is tracked as a function of the upper intersection amplitude minus the amplitude of the first encoder output signal;
in step (b)
  if the amplitude of the second encoder output signal is increasing the fine position of the structure is tracked as a function of the amplitude of the second encoder output signal minus the lower intersection amplitude;
  if the amplitude of the second encoder output signal is decreasing the fine position of the structure is tracked as a function of the upper intersection amplitude minus the amplitude of the second encoder output signal.

7. The method of claim 5 wherein during a defined direction of movement of the encoder:
in step (a):
  if the amplitude of the first encoder output signal is increasing the fine position of the structure is tracked as a function of the upper intersection amplitude minus the amplitude of the first encoder output signal;
  if the amplitude of the first encoder output signal is decreasing the fine position of the structure is tracked as a function of the amplitude of the first encoder output signal minus the lower intersection amplitude;
in step (b)
  if the amplitude of the second encoder output signal is increasing the fine position of the structure is tracked as a function of the upper intersection amplitude minus the amplitude of the second encoder output signal;
  if the amplitude of the second encoder output signal is decreasing the fine position of the structure is tracked as a function of the amplitude of the second encoder output signal minus the lower intersection amplitude.

8. The method of claim 1 wherein periods of each of the first and second encoder output signals vary as a function of a speed of movement of the structure.

9. A method for tracking movement of a structure, the method comprising the steps of:
(a) producing a first encoder output signal having a varying amplitude;
(b) producing a second encoder output signal having a varying amplitude, the second encoder output signal out of phase with the first encoder output signal, the amplitude of the first encoder output signal and the amplitude of the second encoder output signal repeatedly intersecting over time near an upper intersection amplitude and a lower intersection amplitude;
(c) defining four cycle segments for a defined direction of the encoder, including:
  a first cycle segment during which the amplitude of the first encoder output signal falls within a range defined by the upper intersection amplitude and the lower intersection amplitude and the amplitude of the first encoder output signal is increasing;
  a second cycle segment during which the amplitude of the first encoder output signal falls outside the range and the amplitude of the second encoder output signal is increasing;
  a third cycle segment during which the amplitude of the first encoder output signal falls within the range and the amplitude of the first encoder output signal is decreasing;
  a fourth cycle segment during which the amplitude of the first encoder output signal falls outside the range and the amplitude of the second encoder output signal is decreasing;
(d) tracking movement of the structure based upon the first encoder output signal during the first cycle segment and the third cycle segment; and
(e) tracking movement of the structure based upon the second encoder output signal during the second cycle segment and the fourth cycle segment.

10. The method of claim 9 wherein:
in step (d) movement of the structure is tracked as a function of the amplitude of the first encoder output signal minus the lower intersection amplitude during the first cycle segment and movement of the structure is tracked as a function of the upper intersection amplitude minus the amplitude of the first encoder output signal during the third cycle segment;
in step (e) movement of the structure is tracked as a function of the amplitude of the second encoder output signal minus the lower intersection amplitude during the second cycle segment and movement of the structure is tracked as a function of the upper intersection amplitude minus the amplitude of the second encoder output signal during the fourth cycle segment.

11. The method of claim 9 wherein:
in step (d) movement of the structure is tracked as a function of the upper intersection amplitude minus the amplitude of the first encoder output signal during the first cycle segment and movement of the structure is tracked as a function of the amplitude of the first encoder output signal minus the lower intersection amplitude during the third cycle segment;
in step (e) movement of the structure is tracked as a function of the upper intersection amplitude minus the amplitude of the second encoder output signal during the second cycle segment and movement of the structure is tracked as a function of the amplitude of the second encoder output signal minus the lower intersection amplitude during the fourth cycle to segment.

12. The method of claim 9 wherein during the first cycle segment and the third cycle segment a rate of change in amplitude of the first encoder output signal is substantially linear, and during the second cycle segment and the fourth cycle segment a rate of change in amplitude of the second encoder output signal is substantially linear.

13. The method of claim 9 wherein during steps (d) and (e) a fine position of the structure is tracked, the method comprising the further step of tracking a coarse position of the structure as a function of the number of cycle segments which have passed.

14. The method of claim 9 wherein the first and second encoder output signals produced in steps (a) and (b) are substantially ninety degrees out of phase with each other.

15. An analog encoder system for tracking movement of a structure, the system comprising:
a first encoder output providing a first encoder output signal;

a second encoder output providing a second encoder output signal;

the first and second encoder output signals varying in amplitude as the structure moves, the first and second encoder output signals being out of phase with each other, and the first and second encoder output signals repeatedly intersecting each other; and a controller receiving the first and second encoder output signals, the controller tracking movement of the structure based upon the first encoder output signal when an amplitude of the first encoder output signal is within a range defined by an upper intersection amplitude and a lower intersection amplitude and an amplitude of the second encoder output signal is outside the range, and the controller tracking movement of the structure based upon the second encoder output signal when the amplitude of the second encoder output signal is within the range and the amplitude of the first encoder output signal is outside the range.

16. The system of claim 15 wherein the first and second encoder output signals are substantially ninety degrees out of phase with each other.

17. The system of claim 16 further comprising first and second photo sensors, wherein a magnitude of each the first and second encoder output signals varies at least in part as a function of an intensity of light received by first and second photo sensors respectively.

18. The system of claim 15 wherein the amplitude of the first encoder output signal varies in a substantially linear manner when within the range, and the amplitude of the second encoder output signal varies in a substantially linear manner when within the range.

19. The system of claim 15 wherein the controller tracks a fine position of the structure when monitoring only one of the first and second encoder output signals, and the controller tracks a coarse position of the structure as a function of a number of times the upper intersection amplitude and lower intersection amplitude are crossed by the tracked encoder output signal.

20. The system of claim 19 wherein for a defined direction of movement of the encoder:

when the controller is tracking movement of the structure based upon the first encoder output signal:
 if the amplitude of the first encoder output signal is increasing the controller tracks fine position of the structure as a function of the amplitude of the first encoder output signal minus the lower intersection amplitude;
 if the amplitude of the first encoder output signal is decreasing the controller tracks fine position of the structure as a function of the upper intersection amplitude minus the amplitude of the first encoder output signal;

when the controller is tracking movement of the structure based upon the second encoder output signal:
 if the amplitude of the second encoder output signal is increasing the controller tracks fine position of the structure as a function of the amplitude of the second encoder output signal minus the lower intersection amplitude;
 if the amplitude of the second encoder output signal is decreasing the controller tracks fine position of the structure as a function of the upper intersection amplitude minus the amplitude of the second encoder output signal.

21. The system of claim 19 wherein for a defined direction of movement of the encoder:

when the controller is tracking movement of the structure based upon the first encoder output signal:
 if the amplitude of the first encoder output signal is increasing the fine position of the structure is tracked as a function of the upper intersection amplitude minus the amplitude of the first encoder output signal;
 if the amplitude of the first encoder output signal is decreasing the fine position of the structure is tracked as a function of the amplitude of the first encoder output signal minus the lower intersection amplitude;

when the controller is tracking movement of the structure based upon the second encoder output signal:
 if the amplitude of the second encoder output signal is increasing the fine position of the structure is tracked as a function of the upper intersection amplitude minus the amplitude of the second encoder output signal;
 if the amplitude of the second encoder output signal is decreasing the fine position of the structure is tracked as a function of the amplitude of the second encoder output signal minus the lower intersection amplitude.

22. The system of claim 15 wherein periods of each of the first and second encoder output signals vary as a function of a speed of movement of the structure.

23. The system of claim 15 wherein the controller includes an analog to digital converter receiving the first and second encoder output signals and including first and second outputs corresponding to the first and second encoder output signals.

24. The system of claim 23 including a state machine receiving the first and second outputs of the analog to digital converter.

25. A printer including the analog encoder system of claim 15.

26. The printer of claim 25 wherein the structure is a print head carriage mounted for movement across a paper path of the printer.

27. The printer of claim 25 wherein the structure is a paper feed roller.

28. An analog encoder system for tracking movement of a structure, the system comprising:

a first encoder output providing a first encoder output signal;

a second encoder output providing a second encoder output signal;

the first and second encoder output signals varying in amplitude as the structure moves, the first and second encoder output signals being out of phase with each other, and the first and second encoder output signals repeatedly intersecting each other; and a controller receiving the first and second encoder output signals, the controller tracking both a coarse position of the structure and a fine position of the structure, the controller tracking coarse position over time according to a number of times an upper intersection amplitude and a lower intersection amplitude are crossed by the tracked encoder output signal.

29. The system of claim 28 wherein:

when an amplitude of the first encoder output signal is within a range defined by the upper intersection amplitude and the lower intersection amplitude and an amplitude of the second encoder output signal is outside the range, the controller tracks fine position based upon the first encoder output signal; and when the amplitude of the second encoder output signal is within the range and the amplitude of the first encoder output signal is outside the range, the controller tracks fine position based upon the second encoder output signal.

30. The system of claim 29 wherein the amplitude of the first encoder output signal varies in a substantially linear manner when within the range, and the amplitude of the second encoder output signal varies in a substantially linear manner when within the range.

31. The system of claim 28 wherein the first and second encoder output signals are substantially ninety degrees out of phase with each other.

32. The system of claim 28 wherein the controller includes a analog to digital converter which receives the first and second encoder output signals and includes first and second outputs corresponding to the first and second encoder output signals.

33. The system of claim 32 including a state machine receiving the first and second outputs of the analog to digital converter.

34. A printer including the analog encoder system of claim 28.

35. The printer of claim 34 wherein the structure is a print head carriage mounted for movement across a paper path of the printer.

36. The printer of claim 34 wherein the structure is a paper feed roller.

37. An analog encoder system for tracking movement of a structure, the system comprising:

a first encoder output providing a first encoder output signal;

a second encoder output providing a second encoder output signal;

the first and second encoder output signals varying in amplitude as the structure moves, the first and second encoder output signals being out of phase with each other, and the first and second encoder output signals repeatedly intersecting each other; and a controller receiving the first and second encoder output signals, the controller tracking a fine position of the structure by repeatedly switching back and forth between monitoring of the first encoder output signal and monitoring of the second encoder output signal.

38. The system of claim 37 wherein switching back and forth between monitoring of the first encoder output signal and monitoring of the second encoder output signal occurs each time the monitored signal crosses a defined upper intersection amplitude or a defined lower intersection amplitude.

39. The system of claim 38 wherein the first and second encoder output signals are substantially ninety degrees out of phase with each other.

40. A printer including the analog encoder system of claim 37.

41. The printer of claim 40 wherein the structure is a print head carriage mounted for movement across a paper path of the printer.

42. The printer of claim 40 wherein the structure is a paper feed roller.

* * * * *